United States Patent
Pfeiffer

(10) Patent No.: US 6,917,734 B2
(45) Date of Patent: Jul. 12, 2005

(54) TUNABLE OPTICAL DEVICE AND OPTICAL SYSTEM USING THE TUNABLE OPTICAL DEVICE AS CODING FILTER

(75) Inventor: Thomas Pfeiffer, Stuttgart (DE)

(73) Assignee: Alcatel, Paris (FR)

( * ) Notice: Subject to any disclaimer, the term of this patent is extended or adjusted under 35 U.S.C. 154(b) by 148 days.

(21) Appl. No.: 10/290,195

(22) Filed: Nov. 8, 2002

(65) Prior Publication Data

US 2003/0091286 A1 May 15, 2003

(30) Foreign Application Priority Data

Nov. 12, 2001 (EP) .............................. 01440380

(51) Int. Cl.⁷ .............................................. G02B 6/26
(52) U.S. Cl. ......................................... 385/27; 385/37
(58) Field of Search .............................. 385/15, 27, 30, 385/37, 39

(56) References Cited

U.S. PATENT DOCUMENTS

| | | | |
|---|---|---|---|
| 4,991,924 A | 2/1991 | Shankar et al. | |
| 5,586,205 A | * 12/1996 | Chen et al. | .................. 385/29 |
| 5,592,314 A | 1/1997 | Ogasawara et al. | |
| 6,058,226 A | * 5/2000 | Starodubov | .................. 385/12 |
| 6,154,591 A | 11/2000 | Kershaw | |
| 6,215,928 B1 | * 4/2001 | Friesem et al. | ................ 385/37 |
| 6,718,086 B1 | * 4/2004 | Ford et al. | ..................... 385/27 |

FOREIGN PATENT DOCUMENTS

| | | |
|---|---|---|
| DE | 198 39 308 A1 | 3/2000 |
| DE | 199 04 940 A1 | 12/2000 |
| DE | 100 51 633 A1 | 5/2002 |

OTHER PUBLICATIONS

E. Nowinowski–Kruszelnicki et al., "Electrically driven polarization–insensitive liquid crystal narrow–bandpass intensity modulator", *Sensors and Actuators A*, vol. 68, 1998, pp. 316–319.

* cited by examiner

*Primary Examiner*—Daniel St.Cyr
(74) *Attorney, Agent, or Firm*—Sughrue Mion, PLLC

(57) ABSTRACT

According to the present invention the tunable optical device comprises a first optical wave guide and a second optical wave guide defining a space between the two wave guides with space comprises the first cell with liquid crystal material and a second cell with liquid crystal material spaced by a third wave guide and the first and the second cell for liquid crystal material having orientation of the liquid crystal material perpendicular to each other.

8 Claims, 1 Drawing Sheet

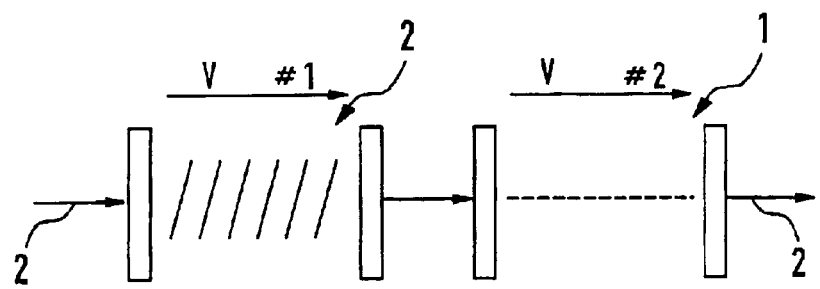
FIG. 1
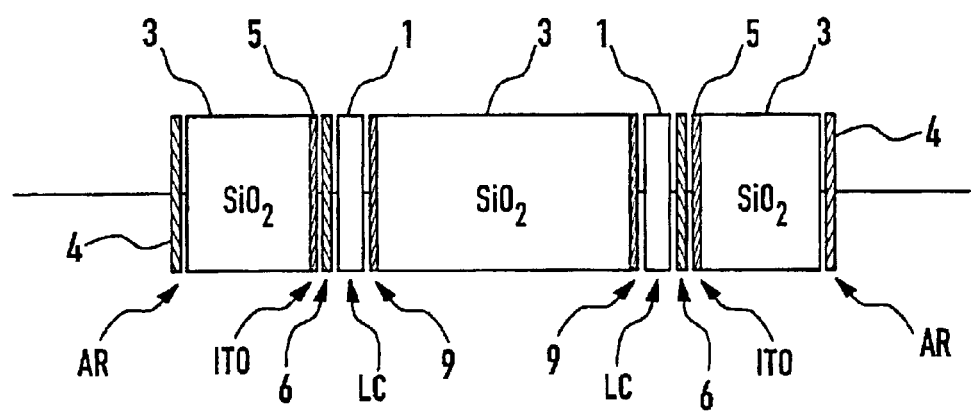
FIG. 2
FIG. 3
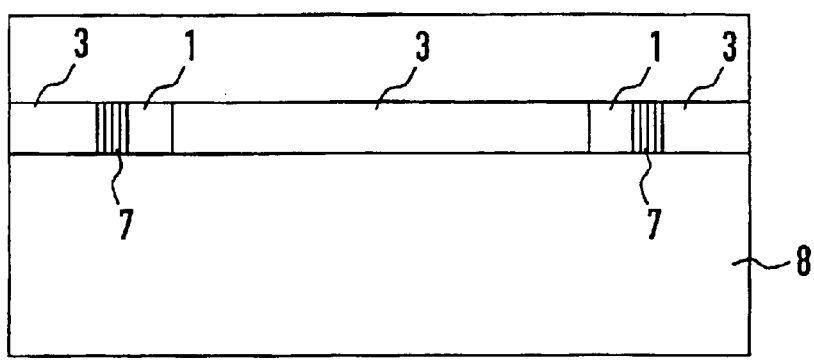

TUNABLE OPTICAL DEVICE AND OPTICAL SYSTEM USING THE TUNABLE OPTICAL DEVICE AS CODING FILTER

FIELD OF THE INVENTION

This invention relates to a tunable optical device that is used in a telecom system especially in a wavelength division multiplexing communication system or an optical code division multiplex system.

BACKGROUND

Differentiation is made between access networks and transport networks for the transmission of data. The access networks, which ensure the access to the consumer, are characterised by complex network structures. The system diversity of these primarily service-specific access systems is very great. Within a communications network, the access network has the function of enabling the subscribers to access switching devices, for example servers. From his location, each subscriber must firstly be connected to a supply node in order to avail himself of the offered services. All information technology means are basically suitable for the connection of the subscribers. In the long-distance network, the routing of the telecommunications traffic is concentrated in point-to-point connections between the different network and switching nodes. On the other hand, in the access network very different requirements must be fulfilled. Standardised functions must be implemented for the technical cooperation between the subscriber exchange and the terminals. The subscribers themselves are not homogeneously distributed over the entire access area; rather, there are local areas with high subscriber densities as well as areas in which the subscribers occur only sporadically. On the basis of the relevant communications requirements, it is possible to distinguish between highly differing subscriber groups, such as private customers and smaller or larger business customers to whom appropriate transmission-technology solutions must be offered. It is in the case of the access networks that willingness is required on the part of the network operator to invest a large capital outlay. The components are exposed to environmental influences and must each be made available individually to the access network subscribers.

A method for constructing access network is known form the prior art German application 199 04 940.8. A transmission system of this kind for coded optical signals consists of optical transmission lines, optical splitters and optionally optical amplifiers insert to transmit code multiplexed optical signals. Each transmitter contains a coder in which the signal to be transmitted are coded prior to their transmission into the optical transmission network. The coding takes place optically by frequency coding using an optical filter. Each receiver, which wishes to receive the data per specific transmitter, must contain a decoder, which is tuned to the coder of this specific transmitter. In the simplest case the frequency ranges which are conductive for an optical signal and the frequency ranges which are blocked for optical signals on the same in the coder and in the decoder. The code division multiplex methods are particularly as suitable for the transmission of not too high bit rates. The code division multiplex message is suitable for use as multipoint- to-multipoint network such as for example a LAN. An example for a broadcasting network the unpublished German application 100 51 633.5. All this examples for access network require optical coding means with high performance. To achieve the coding effect especially optical cavities of Fabry-Perot types are used. To achieve the tunability phase shifters in the cavity of the optical coding means are needed. All effects that are utilized in refractive optical switches are commonly suitable for generating the additional phase shift in a cavity. In particular these are as follows:

a) The electrical optical effect that for example occurs in lithium niobate, plastic or III/V semiconductors for example InGaAsP/InP or GaAlAs/GaAs and whereby an electrical field produces a change in refractive index.

b) Charge carrier injections into III/V semiconductors for example InGaAsP/InP or GaAlAs/GaAs wherein the change in refractive index is defined by the strength of the injection and c) The thermo-optical effect that for example occurs in material systems of glass and silicon and where the temperature T determines the change in refractive index.

Electro-optical phase shifters are polarization dependent and induce high losses. The thermo-optical effect in fibers or wave-guide optics is not very reliable or too expensive due to the fact that the devices consume a high electrical power. Also known are mechanical influences on fibers or waveguide by stretching the wave-guides. Which is also known from prior art are liquid crystal phase shifters that are easy to build and consume not too much electrical power. It is known from the U.S. Pat. No. 6,154,591 to use a tunable optical device comprising a substrate and a superstrate first in the second optical wave guide sandwiched between that substrate and that superstrate so as to define the base between that wave guides an optical resonant cavity extending across that space, that space containing a liquid crystal material to commit tuning of the cavity and alignment means to orientate the liquid crystal material so that it responds to an applied electrical field wherein the alignment means is exposed on at least one of the substrate and the superstrate. Normally the polarization dependent due to the anisotropy structure of the liquid crystal molecules induces the strong birefringence. To avoid this polarization dependence it is also known to use a symmetric arrangement of liquid crystal structures to make a tunable devices polarization insensitive.

SUMMARY OF THE INVENTION

According to the present invention the tunable optical device comprises a first optical waveguide and a second optical wave guide defining a space between the two wave guides which space comprises a first cell with liquid crystal material and a second cell with liquid crystal material spaced by a third waveguide and the first and the second cell for liquid crystal material having orientations of the liquid crystal material perpendicular to each other.

Especially the solution allows avoiding effects of polarization dependency.

Also according to the present invention the tunable device forms an optical cavity by high reflection means in that space where the first and the second cell of liquid crystal are in between the optical cavity. Especially a solution with high reflective mirror layers is an effective and cost reducing solution for a compact optical device.

Also according to the invention an optical device is disclosed with a compact structure comprising along the optical axes in a symmetrical arrangement a first part of silica, a first electrical layer, first higher reflection means and a first liquid crystal cell with an orientation layer, a second part of silica, a second liquid cell comprising an orientation layer, a second high reflection means and a second electrical layer and a third part of silica.

A further aspect of the invention is a method for tuning an optical filter structure with the help of the defined phase shifts in the optical cavity.

DESCRIPTION OF THE INVENTION

Exemplary embodiments of the invention are illustrated in the drawing and explained in detail in the following description. In the drawing:

FIG. 1 shows symmetrical arrangement of liquid crystal cells

FIG. 2 a first embodiment of the tunable optical device

FIG. 3 a second embodiment of the tunable optical device.

FIG. 1 shows as an example two liquid crystal cells 1, which are aligned from the inputted light along the optical axes 2. The cells contain liquid crystal material.

Liquid crystal molecules are typical rod shaped organic molecules with a function to order in temperature. The nematic phase is characterized by the orientation order of the constituent molecules. The molecule orientation can be controlled with an applied electrical field. A well known nematic cell is made of two bounding plates using glass slides, each with a transparent conductive coating such as indium tin oxide, that act as an electrode and spacers to control the cell gap precisely. The surface of the transparent electrodes in contact with the liquid crystal is coated with a thin layer of polymer, which has been rubbed or brushed in one direction. Nematic liquid crystal molecules tend to orient with their long axis parallel to this direction. For the phase shifter the glass plates are arranged so that the molecules adjacent to the top electrode are oriented parallel to those of the bottom.

The state of polarization of the input light with an electrical field vector within the plane of the drawing is affected by the electrical voltage across the first liquid crystal cell 1 via the tilt angel of the liquid crystal molecules in the cell. The higher the tilt angle is the higher the retardation effect on the inputted light vector. In the case the molecules are arranged perfectly parallel to the glass plates and to the inputted light vector the retardation is zero. The voltage does not affect the polarization state with the electrical field vector perpendicular to the plane of the drawing. It is neither attenuated. By crossing the orientation of the molecules in two cascaded liquid crystal cells by 90 degrees relative to each other, both polarization axes of the input light will be retarded to the same amount or if required to different amounts according to the applied voltages and to the geometrical dimensions of the single cells.

A special embodiment of the polarization independent phase shifter is shown in FIG. 2. This solution is a micro-optical implementation with separated wave-guides 3 built as a separate component for individual use in telecommunication systems. The optical device is constructed by fused silica substrate material. To avoid optical losses the device is coated with an anti-reflection layer at the input and output side of the device. Indium tin oxide layers 5 are evaporated for applying electrical voltage across the liquid crystal cells 1. Orientation layer 9 can be integrated separately or in the indium tin oxide layers 5. The filter cavity is defined by the position of the two high reflective coatings 6. Tuning of the optical component is accomplished by applying a single electrical voltage across the filter using the two indium tin oxide layers 5. In another embodiment when the wave-guide 3 in the middle of the device is too thick, additional indium tin oxide layers 5 are deposited between the orientation layers 9 and the wave-guides 3. Then the two cascaded liquid crystal cells 1 are tuned separately. The two liquid crystal cells are tilted by 90 degrees relative to each other.

FIG. 3 shows an integrated planar wave-guide solution for the invention. A substrate 8 is structured to form optical wave-guides 3. The wave-guides 3 are cut at two positions to fill them with the liquid crystal material. Before the liquid crystals are filled in the defined grooves, the electrical layers and reflective layers must be evaporated. The cells are closed another silica layer which is fixed on the silica substrate. Also, other materials and different fixing methods, as gluing melting, are used to close the liquid crystal cells In figure 3 the reflective means for the optical cavity is realized in a Bragg grating 7, which is written into the optical wave-guide 3.

Also in the scope of the invention is a method for tuning an optical filter structure with the help of the defined phase shift in the optical cavity. For this issue the two liquid crystal cells 1 are connected to an electrical source. The voltage applied to the indium tin oxide layers 5 influences the index of refraction in the cavity and allows a very high performing tuning of the optical cavity. Due to the symmetrical structure of the optical device polarization dependence disappears. In another embodiment the two liquid crystal cells 1 are applied separately with separate voltage values.

The tunable filter device is preferably used in an optical code division multiplex system. The filter codes the broadband signal of the different light sources or decodes the received signals at the receiver side. The filter can be used for a translation device to translate one coded signal to another.

The use in an optical code division multiplex system does not limit the scope of the use of the filter.

One process for creating the optical filter is a LIGA procedure. This method produces moulds with a high precision in different polymer materials. Therefore the grooves for the optical filter can be structured in a mould of ceramic, a polymer or silica, which can than be processed to comprise the liquid crystal cells.

Also any other technology, which is known by persons skilled in the art, is possible for shaping the filter structure. Planar waveguide technology, with several steps of masking, aligning and etching in a preferred embodiment, is used to structure a silica filter. For the ITO layers the well-known techniques of vaporization are used.

What is claimed is:

1. A tunable optical device having an optical axis, and comprising:

a first optical wave guide and a second optical wave guide defining a space between the two wave guides, the space comprising a first cell, with liquid crystal material, and a second cell, with liquid crystal material, spaced by a third wave guide, the first and the second cell of liquid crystal having orientations of the liquid crystal material perpendicular to each other, and two high reflection means forming an optical cavity in maid space, wherein the first and the second cell of liquid crystal material are within the optical cavity, and wherein the two reflection means are Bragg gratings.

2. The tunable optical device according claim 1, wherein electrodes for orientation of the liquid crystal material are evaporated on a surface of the liquid crystal cells perpendicular to the optical axis in an optical path of the device.

3. The tamable optical device, according to claim 1, having a compact structure and comprising along the optical axis in the following symmetrical arrangement:

a first part of silica as a waveguide, a first electrical layer, an orientation layer on the first liquid crystal cell, a second part of silica as a waveguide, another orientation layer on the second liquid crystal cell, a second electrical layer, and a third part of silica as a waveguide.

4. The tunable optical device according to claim 3, wherein said parts, layers and cells are integrated in a planar substrate structure, using LIGA technology for forming the integrated structure.

5. The tunable optical device according to claim 3, parts, layers and cells are integrated in a planar substrate structure, using planar waveguide technology for forming the integrated structure.

6. An optical transmission system comprising broadband light sources, coding means, transmission lines and receivers, and using an optical code division multiplex transmission scheme, wherein the coding means is a tunable optical device having an optical axis, and comprises:

a first optical wave guide and a second optical wave guide defining a space between the two wave guides, the space comprising a first cell, with liquid crystal material, and a second cell, with liquid crystal material, spaced by a third wave guide, the first and the second cell of liquid crystal having orientations of the liquid crystal material perpendicular to each other, and two high reflection means forming an optical cavity in said space, wherein the first and the second cell of liquid crystal material are within the optical cavity, and wherein the two reflection means are Bragg gratings.

7. The optical transmission system according to claim 6, wherein the tunable optical device has a compact structure and comprises, along the optical axis, the following symmetrical arrangement:

a first part of silica as a waveguide, a first electrical layer, an orientation layer on the first liquid crystal cell, a second part of silica as a waveguide;

another orientation layer on the second liquid crystal cell, a second electrical layer, and a third part of silica as a waveguide.

8. A method for tuning an optical device which has an optical axis, and which comprises: a first optical wave guide and a second optical wave guide defining a space between the two wave guides, the space comprising a first cell, with liquid crystal material, and a second cell, with liquid crystal material: spaced by a third wave guide, the first and the second cell of liquid crystal having orientations of the liquid crystal material perpendicular to each other, and two high reflection means forming an optical cavity in said space, wherein the first and the second cell of liquid crystal material are within the optical cavity, and wherein the two reflection means Bragg gratings, said method comprising influencing the index of refraction of the material in the cavity by applying an electrical field across said first and second liquid crystal cells.

* * * * *